(12) United States Patent
Pietrasik

(10) Patent No.: US 8,436,843 B2
(45) Date of Patent: May 7, 2013

(54) COLOR IMAGING SYSTEM

(76) Inventor: John Pietrasik, Clarkston, MI (US)

( * ) Notice: Subject to any disclaimer, the term of this patent is extended or adjusted under 35 U.S.C. 154(b) by 252 days.

(21) Appl. No.: 13/037,434

(22) Filed: Mar. 1, 2011

(65) Prior Publication Data

US 2011/0148952 A1  Jun. 23, 2011

Related U.S. Application Data

(63) Continuation-in-part of application No. 11/786,014, filed on Apr. 10, 2007, now Pat. No. 7,920,137.

(51) Int. Cl.
*G06F 3/038* (2006.01)

(52) U.S. Cl.
USPC ............... 345/207; 345/77; 345/83; 345/102; 345/204; 315/169.3

(58) Field of Classification Search ............ 345/76–78, 345/82–83, 102, 204, 207, 214, 690–691; 315/169.3; 348/271–273, 277–279; 313/463; 257/E33.062
See application file for complete search history.

(56) References Cited

U.S. PATENT DOCUMENTS

| | | | |
|---|---|---|---|
| 5,965,875 A | 10/1999 | Merrill | |
| 6,600,562 B1 | 7/2003 | Chang | |
| 6,771,314 B1 | 8/2004 | Bawolek | |
| 6,873,339 B2 | 3/2005 | Ohsawa et al. | |
| 2004/0100437 A1* | 5/2004 | Hunter et al. | 345/102 |

* cited by examiner

*Primary Examiner* — Abbas Abdulselam
(74) *Attorney, Agent, or Firm* — Dickinson Wright PLLC

(57) ABSTRACT

A color imaging system includes a sensor assembly having a plurality of sensor pixels for sensing incident light. The sensor pixels generate photocurrents in response to sensing the incident light. An image processor receives the photocurrents and computes a plurality of photocurrent values. A display processor receives the photocurrent values and calculates a plurality of power values. A display driver receives the power values and generates a plurality of power signals. The color imaging system further includes a display device having a plurality of light emitting devices, each being powered by one of the power signals for emitting light. At least one of the light emitting devices is a deep-violet light emitting device for only emitting light having a peak emission wavelength in the range of 400 to 405.87 nm and having a full width at half maximum (FWHM) value of no greater than 1 nm.

20 Claims, 3 Drawing Sheets

COLOR IMAGING SYSTEM

CROSS REFERENCE TO RELATED APPLICATION

This application is a continuation-in-part of U.S. patent application Ser. No. 11/786,014, filed Apr. 10, 2007, now U.S. Pat. No. 7,920,137 which is incorporated herein by reference in its entirety.

BACKGROUND OF THE INVENTION

1. Field of the Invention

The subject invention relates to a color imaging system for reproducing colors of incident light.

2. Description of the Prior Art

The ability of the human eye to distinguish color results from stimulating three types of retinal receptors, i.e. cones, contained within the retina of the eye. The three types of cones contained in the eye are typically referred to as L-cones, M-cones, and S-cones. Each of the three types of cones is responsive to a specific wavelength range. For example, L-cones have a peak sensitivity in the orange region of the visible spectrum. M-cones have a peak sensitivity in the green region of the visible spectrum. S-cones have a peak sensitivity in the blue region of the visible spectrum and are sensitive to light having a wavelength as small as 380 nm. The various wavelengths of light stimulate the cones, which cause each cone to generate an electrical impulse. The electrical impulses are combined and are communicated to the brain via the optic nerve. Based on the electrical impulses, the brain distinguishes the color of light received through the eye.

Color imaging systems are used to reproduce the colors of images. Traditional color imaging systems include image sensors having red, green and blue sensor pixels that sense red, green and blue incident light, respectively. The sensor pixels can be arranged in a vertical relationship with one another, as disclosed in U.S. Pat. No. 5,965,875 to Merrill, or the sensor pixels may be disposed in a horizontal arrangement with one another, as disclosed in U.S. Pat. No. 3,971,065 to Bayer. Each sensor pixel delivers a signal to a color display module. The color display module emits light intended to reproduce the colors sensed by the sensor pixels.

The color imaging system includes a plurality of light emitting devices for emitting light. Traditional color imaging systems utilize red light emitting devices for emitting red light, green light emitting devices for emitting green light, and blue light emitting devices for emitting blue light. For example, US Patent Application Publication Number 2004/0100437, assigned to Hunter et al. and published on May 27, 2004 (hereinafter referred to as Hunter '437), shows a color display system that uses a light emitting diode (LED) as a blue light emitting device having peak light emission in the range of between 400 and 450 nm. LEDs and other phosphor based light emitting devices are known to emit light at a very wide band of wavelengths. The full width at half maximum (FWHM) is a measure of the range of wavelengths emitted by a light source. For example, LEDs generally have a full width at half maximum (FWHM) value of between 20 and 50 nm. In other words, much of the light emitted by a LED has a wavelength of greater than 25 nm from the peak emission wavelength of that LED. In summary, the range of wavelengths actually emitted by even the most focused LED light sources will vary significantly from that LED's peak emission wavelength.

SUMMARY OF THE INVENTION AND ADVANTAGES

A color imaging system for reproducing the color of an image is presented including a plurality of light emitting devices for emitting light. The invention includes a display device including at least one deep-violet light emitting device for emitting deep-violet light having a peak emission wavelength in the range of 400.00 to 405.87 nm and having a full width at half maximum (FWHM) of no greater than one nanometer (1 nm).

The light emitted by the deep-violet light emitting device stimulates the S-cones of the human eye with very little or no stimulation of the M-cones or the L-cones. Consequently, the light emitted from the deep violet light emitting device appears to the human eye as a deep violet color. All of the prior art color imaging systems either emit light having a peak emission of greater than 405.87 nm or a FWHM of greater than 1 nm. In other words, all of the prior art imaging systems emit some light that stimulates at least the M-cones of the human eye in addition to the S-cones. This deep-violet light cannot be replicated by the imaging systems of the prior art, either directly or by combining the blue and the red light emitting devices of the prior art imaging systems.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 3:
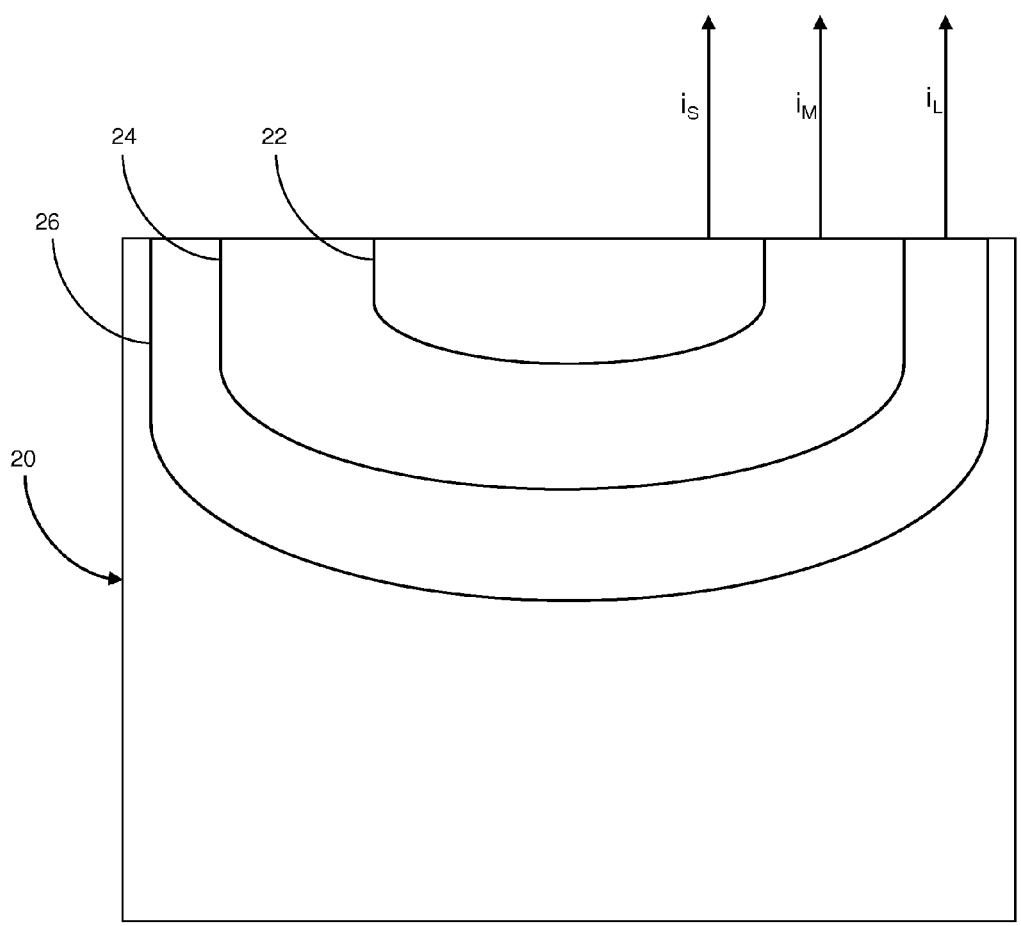
FIG. 3 is a perspective view of an orange sensor pixel, a green sensor pixel, and a blue sensor pixel disposed in vertical arrangement with one another.

Referring to the Figures, wherein like numerals indicate corresponding parts throughout the several views, a color imaging system is illustrated including a sensor assembly 20 having a plurality of sensor pixels 22, 24, 26 for sensing incident light. The sensor assembly 20 includes a plurality of blue, green, and orange sensor pixels 22, 24, 26. The blue sensor pixels 22 sense blue incident light with each of the blue sensor pixels 22 and generate a short wavelength photocurrent ($i_S$) in response to sensing the blue incident light. The green sensor pixels 24 sense green incident light with each of the green sensor pixels 24 and generate a medium wavelength photocurrent ($i_M$) in response to sensing the green incident light. The orange sensor pixels 26 sense orange incident light with each of the orange sensor pixels 26 and generate a long wavelength photocurrent ($i_L$) in response to sensing the orange incident light. In an exemplary embodiment illustrated in FIG. 3, the sensor pixels 22, 24, 26 are arranged in a vertical alignment with each other. Specifically, each of the green sensor pixels 24 is disposed above one of the orange sensor pixels 26, and each of the blue sensor pixels 22 is disposed above one of the green sensor pixels 24.

The color imaging system further includes an image processor 28 being in communication with the sensor assembly 20 for receiving at least one of the short wavelength photocurrents ($i_S$), at least one of the medium wavelength photocurrents ($i_M$), and at least one of the long wavelength photocurrents ($i_L$). The short ($i_S$), medium ($i_M$), and long photocurrents ($i_L$) are used to compute a plurality of short photocurrent values, medium photocurrent values, and long photocurrent values. In one embodiment, the image processor 28 may compute interpolated photocurrent values to be saved to and read from an image memory device 30. The interpolated photocurrent values are mathematical combinations of directly received photocurrent values from the sensor assembly 20 having a configuration such as that disclosed in U.S. Pat. No. 3,971,065 by Bayer. Alternatively, the image processor may calculate a specific photocurrent value directly from each photocurrent generated by each sensor pixel. Specifically, each short photocurrent value corresponds to one of the short photocurrents ($i_S$), each medium photocurrent value corresponds to one of the medium photocurrents ($i_M$), and each long photocurrent value corresponds to one of the long photocurrents ($i_L$). As discussed above, an image memory device 30 may be utilized with the color display for storing the photocurrent values. The image memory device 30 is in communication with the image processor 28 for saving and reading the photocurrent values to and from the image memory device 30.

The color imaging system further includes a display processor 32 being in communication with the image processor 28. The display processor 32 is preprogrammed with the formulas:

$$S_S(\lambda_L)P_L + S_S(\lambda_M)P_M + S_S(\lambda_S)P_S = i_S$$

$$S_M(\lambda_L)P_L + S_M(\lambda_M)P_M + S_M(\lambda_S)P_S = i_M$$

$$S_L(\lambda_L)P_L + S_L(\lambda_M)P_M + S_L(\lambda_S)P_S = i_L,$$

wherein $S_S(\lambda)$ is the sensitivity function of the blue sensor pixels (22),
wherein $S_M(\lambda)$ is the sensitivity function of the green sensor pixels (24),
wherein $S_L(\lambda)$ is the sensitivity function of the orange sensor pixels (26),
wherein $\lambda_L$ is the wavelength of the deep-red light emitting device (40),
wherein $\lambda_M$ is the wavelength of the green light emitting device (42), and
wherein $\lambda_S$ is the wavelength of the deep-violet light emitting device (44).

The formulas stated above are color matching formulas that determine the radiometric power levels ($P_S$, $P_M$, $P_L$) required for a given set of primary light sources for emitting light to produce the same visual response as a known incident spectrum. The most appropriate primary wavelengths ($\lambda_S$, $\lambda_M$, $\lambda_L$) are those which ideally stimulate only one cone type per primary. If it is not possible to stimulate only cone type, then the values of the primaries ($\lambda_S$, $\lambda_M$, $\lambda_L$) should be chosen so as to minimize the total radiometric power contribution to the other cone types. Further, the primaries ($\lambda_S$, $\lambda_M$, $\lambda_L$) should chosen such that required radiometric power levels ($P_S$, $P_M$, $P_L$) needed to stimulate the respective cone types in the retina are at levels which are safe to the human eye. With the above criteria in mind, it is desirable that the S-cone primary ($\lambda_S$) should be chosen to be deep-violet (around 400 nm), the M-cone primary ($\lambda_M$) should be chosen to be green (around 530 nm), and the L-cone primary ($\lambda_L$) should be chosen to be deep-red (around 700 nm).

The display processor 32 is in communication with the image processor 28 for receiving the photocurrent values and for calculating at least one short power value ($P_S$), at least one medium power value ($P_M$), and at least one long power value ($P_L$) based on the formulas stated above. A frame buffer 34 may be utilized in communication with the display processor 32 for storing the power values and for sending the power values to and from the display processor 32.

The color imaging system further includes a display driver 36 being in communication with the display processor 32 for reading the power values. Based on the power values, the display driver 36 generates a plurality of power signals including at least one short power signal ($P_S$) having a power of at least one of the short power values, a medium power signal ($P_M$) having a power of at least one of the medium power values, and a long power signal ($P_L$) having a power of at least one of the long power values.

A display device 38 is in communication with the display driver 36. The display device 38 includes a plurality of deep-red light emitting devices 40 for emitting deep-red light, a plurality of green light emitting devices 42 for emitting green light, and a plurality of deep-violet light emitting devices 44 for emitting deep-violet light. The light emitting devices 40, 42, 44 may be laser light sources 40, 42, 44, which are known to emit a very narrow band of wavelengths therefrom. The green light emitting device 42 emits light having a peak emission wavelength ($\lambda_M$) in the range of 526.66 to 532.92 nm. The deep-red light emitting device 40 emits light having a peak emission wavelength ($\lambda_L$) in the range of 661.78 to 700.00 nm. The deep-violet light emitting device 44 emits light having a peak emission wavelength ($\lambda_S$) in the range of 400.00 to 405.87 nm. Each of the red, green, and deep-violet light emitting devices 40, 42, 44 emits light having a full width at half maximum (FWHM) of no greater than one nanometer (1 nm). Both the peak emission range and the FWHM of the light emitted by the deep-violet light emitting device 44 are extremely important to ensure that M-cones or L-cones of the human eye are not stimulated. In other words, the deep-violet light emitting device 44 must only emit light over a specific and narrow band of wavelengths.

The power signals ($P_S$, $P_M$, $P_L$) generated by the display driver 36 power the light emitting devices 40, 42, 44. Specifically, each of the short power signals ($P_S$) powers at least one of the deep-violet light emitting devices 44, each of the medium power signals ($P_M$) powers at least one of the green light emitting devices 42, and each of the long power signals ($P_L$) powers at least one of the deep-red light emitting devices 40. A light intensity controller 46 may be utilized in communication with the display driver 36 for numerically adjusting the power values. By varying the numerical power values, the brightness of the light emitted by the light emitting devices 40, 42, 44 can be adjusted.

Figure 1:
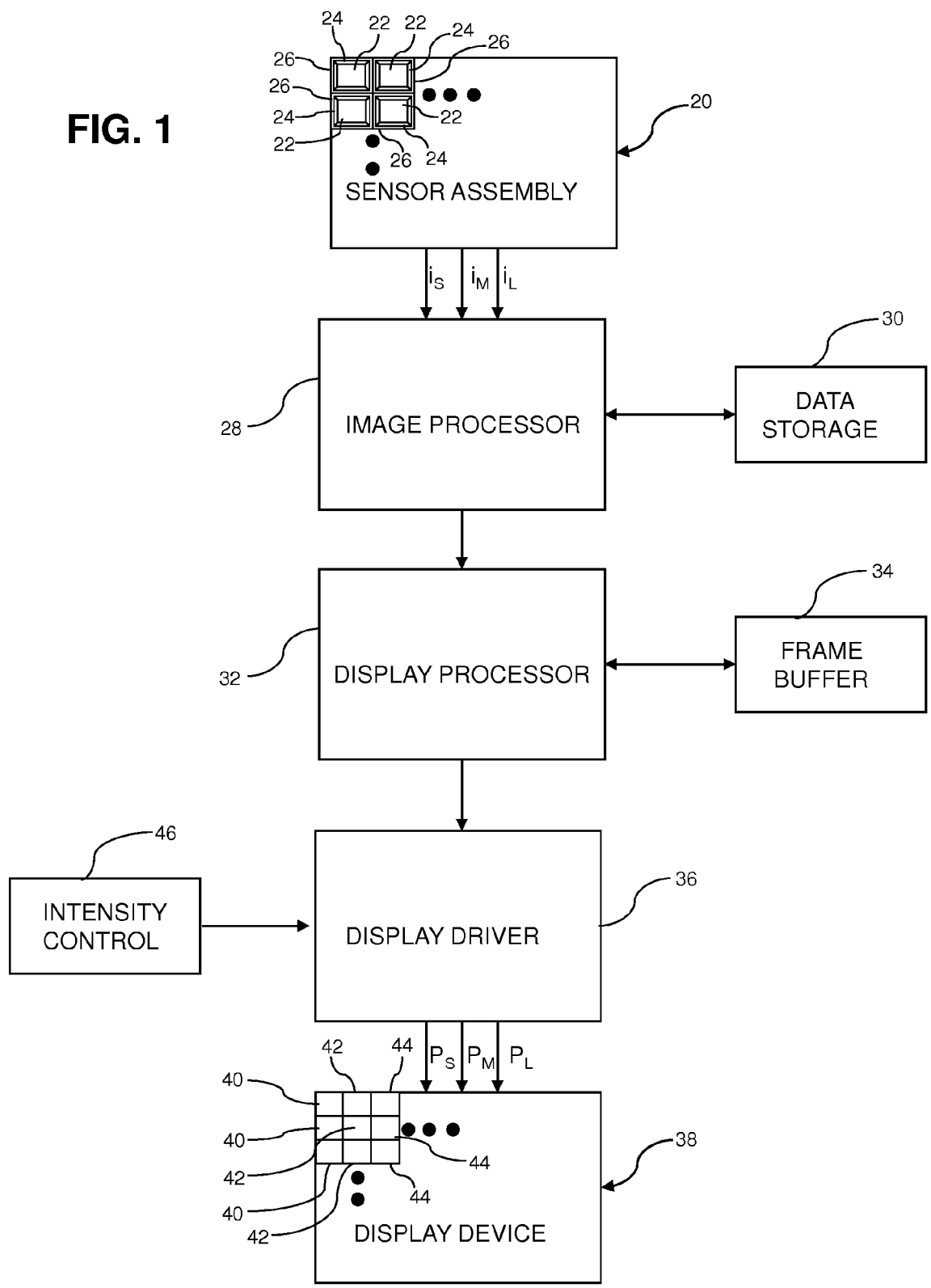
FIG. 1 is a block diagram of a color imaging system for reproducing color of an image according to the present invention.
Figure 2:
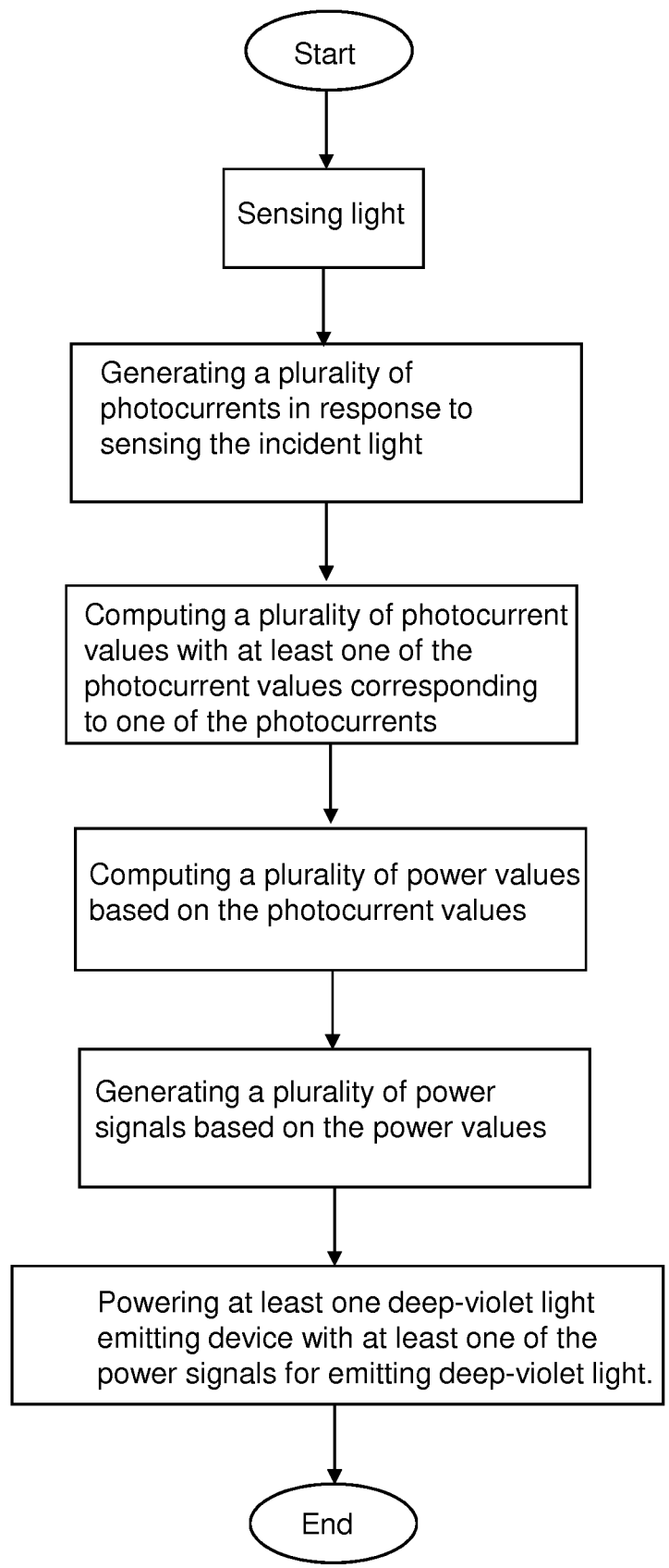
FIG. 2 is a flow chart illustrating a method for reproducing color of an image.

FIG. 2 illustrates a method for reproducing the color of an image. The method begins by sensing incident light. A sensor assembly 20 having sensor pixels 22, 24, 26 can be used to sense short wavelengths of light with a peak sensitivity in the blue region of the visible spectrum, medium wavelengths of light with a peak sensitivity in the green region of the visible spectrum, and long wavelengths of light with a peak sensitivity in the orange region of the visible spectrum. The method continues by generating a plurality of photocurrents in response to sensing the incident light. For example, each sensor pixel 22, 24, 26 can generate a photocurrent ($i_S$, $i_M$, $i_L$) indicative of corresponding light sensed by the sensor pixel 22, 24, 26. The method proceeds by computing a plurality of photocurrent values with at least one of the photocurrent values corresponding to one of the photocurrents ($i_S$, $i_M$, $i_L$). The method continues by computing a plurality of power values based on the photocurrent values. The method continues by generating a plurality of power signals based on the power values. The power signals include at least one short power signal ($P_S$), at least one medium power signal ($P_M$) and at least one long power signal ($P_L$). The method proceeds by powering at least one deep-violet light emitting device (44) with one of the short power signals ($P_S$) for emitting deep-violet light. The method further includes powering at least one green light emitting device (42) with one of the medium power signals ($P_M$) for emitting green light, and at least one deep-red light emitting device (40) with one of the long power signals ($P_L$) for emitting deep-red light before the method ends. By modeling the retina of the human eye as an equivalent array of semiconductor photodiode elements, an optimum set of monochromatic primary sources can be determined by the equations provided above. Accordingly, a display having an optimal color gamut can be constructed for reproducing a wide range of incident light, including deep-violet light having a wavelength of about 400 nm and deep-red light having a wavelength of about 700 nm.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. In addition, the reference numerals in the claims are merely for convenience and are not to be read in any way as limiting.

What is claimed is:

1. A color imaging system comprising;
    a display device (38) for receiving a plurality of power signals and having a plurality of light emitting devices (40, 42, 44) for emitting light,
    said light emitting devices (40, 42, 44) of said display device including at least one deep-violet light emitting device (44) for emitting deep-violet light and at least one green light emitting device (42) for emitting green light and at least one deep-red light emitting device (40) for emitting deep-red light,
    and characterized by
    said deep-violet light emitted by said deep-violet light emitting device (44) having a peak emission wavelength $\lambda_S$ in the range of 400.00 to 405.87 nm and having a full width at half maximum value of no greater than 1 nm.

2. The color imaging system as set forth in claim 1 wherein said green light emitted by said green light emitting device (42) has a peak emission wavelength $\lambda_M$ in the range of 526.66 to 532.92 nm and a full width at half maximum value of no greater than 1 nm.

3. The color imaging system as set forth in claim 1 wherein said deep-red light emitted by said deep-red light emitting device (40) has a peak emission wavelength 4 in the range of 661.68 to 700.00 nm and a full width at half maximum value of no greater than 1 nm.

4. The color imaging system as set forth in claim 1 wherein said deep-violet light emitting device (44) and said green light emitting device (42) and said deep-red light emitting device (40) are laser light sources.

5. The color imaging system as set forth in claim 1 further including a sensor assembly (20) having a plurality of sensor pixels (22, 24, 26) for sensing incident light to generate a plurality of photocurrents in response to sensing the incident light.

6. The color imaging system as set forth in claim 5 further including an image processor (28) being in communication with said sensor assembly (20) for receiving said photocurrents and for computing at least one photocurrent value with each of said photocurrent values corresponding to one or more of said photocurrents.

7. The color imaging system as set forth in claim 6 further including a display processor (32) in communication with said image processor (28) for receiving said photocurrent values and for calculating a plurality of power values based on said photocurrent values.

8. The color imaging system as set forth in claim 7 further including a display driver (36) in communication with said display processor (32) for receiving each of said power values and for generating a plurality of power signals having a power corresponding to at least one of said power values and in communication with said display device (38) for sending said power signals to said display device (38).

9. The color imaging system as set forth in claim 8 wherein said plurality of power signals includes at least one short power signal ($P_S$) for powering at least one of said deep-violet light emitting devices (44) and at least one medium power signal ($P_M$) for powering at least one of said green light emitting devices (42) and at least one long power signal ($P_L$) for powering at least one of said deep-red light emitting devices (40).

10. The color imaging system as set forth in claim 9 wherein said plurality of sensor pixels (22, 24, 26) includes a blue sensor pixel (22) for sensing blue incident light and for generating a short wavelength photocurrent ($i_S$) in response to sensing the blue incident light.

11. The color imaging system as set forth in claim 10 wherein said plurality of sensor pixels (22, 24, 26) includes a green sensor pixel (24) for sensing green incident light and for generating a medium wavelength photocurrent ($i_M$) in response to sensing the green incident light.

12. The color imaging system as set forth in claim 11 wherein said plurality of sensor pixels (22, 24, 26) includes an orange sensor pixel (26) for sensing orange incident light and for generating a long wavelength photocurrent ($i_L$) in response to sensing the orange incident light.

13. The color imaging system as set forth in claim 12 wherein at least one of said photocurrent values is a short wavelength photocurrent value corresponding with one of said short wavelength photocurrents ($i_S$) and wherein at least one of said photocurrent values is a medium wavelength photocurrent value corresponding with one of said medium wavelength photocurrents ($i_M$) and wherein at least one of said photocurrent values is a long wavelength photocurrent value corresponding with one of said long wavelength photocurrents ($i_L$).

14. The color imaging system as set forth in claim 13 wherein at least one of the plurality of power values is a short power value ($P_S$) corresponding with one of said short wavelength photocurrent values and wherein at least one of the plurality of power values is a medium power value ($P_M$) corresponding with one of said medium wavelength photocurrent values and wherein at least one of the plurality of power values is a long power value ($P_L$) corresponding with one of said long wavelength photocurrent values.

15. A color imaging system comprising;
    a sensor assembly (20) having a plurality of sensor pixels (22, 24, 26) for sensing incident light and generating a plurality of photocurrents in response to sensing the incident light,
    said plurality of sensor pixels (22, 24, 26) including at least one blue sensor pixel (22) for sensing blue incident light and for generating a short wavelength photocurrent ($i_S$) in response to sensing the blue incident light and including at least one green sensor pixel (24) for sensing green incident light and for generating a medium wavelength photocurrent ($i_M$) in response to sensing the green incident light and including at least one orange sensor pixel

(26) for sensing orange incident light and for generating a long wavelength photocurrent ($i_L$) in response to sensing the orange incident light, an image processor (28) being in communication with said sensor assembly (20) for receiving each of said photocurrents and for computing at least one photocurrent value corresponding to one or more of said photocurrents, said photocurrent values computed by said image processor (28) including at least one short wavelength photocurrent value corresponding to one of said short wavelength photocurrents and at least one medium photocurrent value corresponding to one of said medium wavelength photocurrents and at least one long wavelength photocurrent value corresponding to one of said long wavelength photocurrents, a display processor (32) being in communication with said image processor (28) for receiving each of said photocurrent values and for calculating a plurality of power values based on said photocurrent values, said plurality of power values calculated by said display processor (32) including at least one short power value ($P_S$) corresponding with one of said short wavelength photocurrent values and at least one medium power value ($P_M$) corresponding with one of said medium wavelength photocurrent values and at least one long power value ($P_L$) corresponding with one of said long wavelength photocurrent values, said plurality of power signals including at least one short power signal ($P_S$) for powering at least one of said deep-violet light emitting devices (44) and at least one medium power signal ($P_M$) for powering at least one of said green light emitting devices (42) and at least one long power signal ($P_L$) for powering at least one of said deep-red light emitting devices (40), a display driver (36) being in communication with said display processor (32) for receiving each of said power values and for generating a plurality of power signals having a power corresponding to at least one of said power values, a display device (38) being in communication with said display driver (36) and having a plurality of light emitting devices (40, 42, 44) being powered by said power signals for emitting light, said light emitting devices (40, 42, 44) of said display device (38) being laser light sources (40, 42, 44) and including at least one deep-violet light emitting device (44) for emitting deep-violet light and at least one green light emitting device (42) for emitting green light and at least one deep-red light emitting device (40) for emitting deep-red light, said green light emitted by said green light emitting device (42) having a peak emission wavelength $\lambda_M$ in the range of 526.66 to 532.92 nm and having a full width at half maximum value of no greater than 1 nm, said deep-red light emitted by said deep-red light emitting device (40) having a peak emission wavelength $\lambda_L$ in the range of 661.68 to 700.00 nm and having a full width at half maximum value of no greater than 1 nm, and characterized by said deep-violet light emitted by said deep-violet light emitting device (44) having a peak emission wavelength $\lambda_S$ in the range of 400.00 to 405.87 nm and having a full width at half maximum value of no greater than 1 nm.

16. A method for displaying an image with a display device (38) comprising the steps of:

providing a plurality of light emitting devices (40, 42, 44) including at least one deep-violet light emitting device (44) for emitting deep-violet light and at least one green light emitting device (42) for emitting green light and at least one deep-red light emitting device (40) for emitting deep-red light, and characterized by powering the deep-violet light emitting device (44) to emit deep-violet light having a peak emission wavelength $\lambda_S$ in the range of 400.00 to 405.87 nm and having a full width at half maximum value of no greater than 1 nm.

17. The method as set forth in claim 16 further comprising the step of powering the green light emitting device (42) to emit green light having a peak emission wavelength $\lambda_M$ in the range of 526.66 to 532.92 nm and having a full width at half maximum value of no greater than 1 nm.

18. The method as set forth in claim 16 further comprising the step of powering the deep-red light emitting device (40) to emit deep-red light having a peak emission wavelength $\lambda_L$ in the range of 661.68 to 700.00 nm and having a full width at half maximum value of no greater than 1 nm.

19. The method as set forth in claim 16 further including the steps of sensing incident light with a sensor having a plurality of sensor pixels and generating a plurality of photocurrents as a function of the incident light, computing a plurality of photocurrent values as a function of the photocurrents with an image processor (28), calculating a plurality of power values as a function of the photocurrent values with a display processor (32), and generating a plurality of power signals as a function of the power values with a display driver (36).

20. The method as set forth in claim 19 further including the step of transmitting the power values from the display processor (32) to the display driver (36) to power the light emitting devices (40, 42, 44).

\* \* \* \* \*